US010006410B2

United States Patent
Moffat et al.

(10) Patent No.: US 10,006,410 B2
(45) Date of Patent: Jun. 26, 2018

(54) APPARATUS AND METHOD FOR WARMING UP AN ENGINE

(71) Applicant: Ford Global Technologies, LLC, Dearborn, MI (US)

(72) Inventors: John Moffat, Chelmsford (GB); Chris James Leck, Enfield (GB)

(73) Assignee: Ford Global Technologies, LLC, Dearborn, MI (US)

( * ) Notice: Subject to any disclaimer, the term of this patent is extended or adjusted under 35 U.S.C. 154(b) by 369 days.

(21) Appl. No.: 13/857,065

(22) Filed: Apr. 4, 2013

(65) Prior Publication Data

US 2013/0276765 A1 Oct. 24, 2013

(30) Foreign Application Priority Data

Apr. 19, 2012 (GB) .................................. 1206903.5

(51) Int. Cl.
*F02M 25/07* (2006.01)
*F02B 29/04* (2006.01)

(52) U.S. Cl.
CPC ......... *F02M 25/07* (2013.01); *F02B 29/0437* (2013.01); *F02B 29/0493* (2013.01); *Y02T 10/146* (2013.01)

(58) Field of Classification Search
USPC ....... 123/568.12, 41.01, 41.51, 41.57, 559.1, 123/563
See application file for complete search history.

(56) References Cited

U.S. PATENT DOCUMENTS

| 4,317,439 A | * | 3/1982 | Emmerling | ............... F01P 3/20 |
| | | | | 123/563 |
| 4,342,200 A | | 8/1982 | Lowi, Jr. | |
| 4,561,387 A | | 12/1985 | Korkemeier et al. | |
| 6,116,026 A | | 9/2000 | Freese | |
| 6,167,703 B1 | | 1/2001 | Rumez et al. | |
| 7,210,468 B1 | | 5/2007 | Saele | |
| 7,305,976 B1 | | 12/2007 | Clarke | |

(Continued)

FOREIGN PATENT DOCUMENTS

| CN | 102057142 A | 5/2011 |
| DE | 102008031122 A1 | 2/2010 |

(Continued)

OTHER PUBLICATIONS

Anonymous, "Intelligent Auxiliary Water Heater Pump Control for Automotive Applications," IPCOM No. 000138732, Published Jul. 31, 2006, 3 pages.

(Continued)

*Primary Examiner* — Lindsay Low
*Assistant Examiner* — Ruben Picon-Feliciano
(74) *Attorney, Agent, or Firm* — Julia Voutyras; McCoy Russell LLP

(57) ABSTRACT

An engine system for a vehicle is described in which a turbocharger adapted to compress intake air is thermally coupled to a charge air cooler device operatively interposing the turbocharger and the engine. The system further includes a reconfigurable cooling system operable in three modes based on the flow of coolant and temperatures detected therein. In particular, the approach may be used to enhance engine warm-up in cold ambient conditions without costly additional devices.

20 Claims, 5 Drawing Sheets

(56) References Cited

U.S. PATENT DOCUMENTS

| | | |
|---|---|---|
| 7,310,946 B2 | 12/2007 | Rogg et al. |
| 7,669,416 B2 | 3/2010 | Pantow et al. |
| 7,806,091 B2 | 10/2010 | Esau et al. |
| 2002/0195090 A1* | 12/2002 | Marsh et al. ................. 123/563 |
| 2009/0126657 A1* | 5/2009 | Mokire et al. ............. 123/41.33 |

FOREIGN PATENT DOCUMENTS

| | | |
|---|---|---|
| EP | 2357351 A1 | 8/2011 |
| GB | 2316445 B | 11/1998 |
| GB | 2375388 A | 5/2001 |
| WO | 2009151379 A1 | 12/2009 |

OTHER PUBLICATIONS

Partial Translation of Office Action of Chinese Application No. 201310138087.4, dated Jun. 30, 2016, State Intellectual Property Office of PRC, 8 pages.

\* cited by examiner

APPARATUS AND METHOD FOR WARMING UP AN ENGINE

CROSS REFERENCE TO RELATED APPLICATIONS

The present application claims priority to United Kingdom Patent Application 1206903.5, filed on Apr. 19, 2012, the entire contents of which are hereby incorporated by reference for all purposes.

FIELD

The present description relates to a system and method for heat exchange within a vehicle. In particular, but not exclusively, the apparatus and method for heat exchange within a vehicle relates to coolant circuits which are configurable depending on environmental or engine conditions. The system and method may be particularly useful for warming up an engine in cold ambient temperatures.

BACKGROUND AND SUMMARY

Modern vehicles utilize smaller and/or turbocharged engines in order to enhance fuel economy and fuel emissions. However, these engines produce less thermal waste heat and therefore suffer from a decreased thermal capacitance and longer engine warm-up times. The decreased production of heat within the engine system further propagates into a slow increase of the coolant and engine oil temperatures, particularly in cold ambient temperatures (e.g., less than 15 degrees Centigrade) and in sub-zero conditions where cabin comfort becomes a primary concern.

In order to mitigate this problem, previous solutions have used additional devices such as: glow plug heaters, electric air heaters, fuel fired heaters, coolant control valves and enhanced engine management software (e.g., using spark retard). However, additional devices can be costly and typically operate at the expense of fuel economy. A charge air cooler (CAC) is also often used to cool air after it has passed through a turbocharger, but before it enters the engine. The lower temperature air generates more optimal power during the combustion process within the engine. However, the CACs are frequently water cooled by a dedicated and separate coolant circuit which incorporates an air/coolant heat exchanger, radiator and electric water pump.

The inventors have recognized disadvantages with the above approaches and herein disclose a system and method for managing thermal flow particularly in relation to the heating of an engine of a vehicle. In one particular example, the engine system comprises a turbocharger adapted to compress intake air prior to the intake air being received at the engine, a charge air cooler device operatively interposing the turbocharger and the engine, wherein a coolant system is operable in three different modes to control the flow of heat in the engine system. For example, the coolant system may operate in a first mode to provide a first coolant circuit for cooling the engine and a second separate coolant circuit for cooling air passing through the charge air cooler device, whereas the coolant system may operate in a second mode to provide a third coolant circuit in which coolant from the engine is transmitted to the charge air cooler device for heating before being recirculated back to the engine to heat the engine.

The present description may provide several advantages. In particular, the approach may enhance engine warm-up without costly additional devices. Furthermore, advantages are offered in that engine warm-up is achieved without adversely affecting vehicle fuel economy, especially in cold ambient temperatures. Therefore, enhanced fuel economy may be obtained through enhanced combustion stability in severely cold ambient temperatures. In addition, the engine system described is straightforward to implement.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
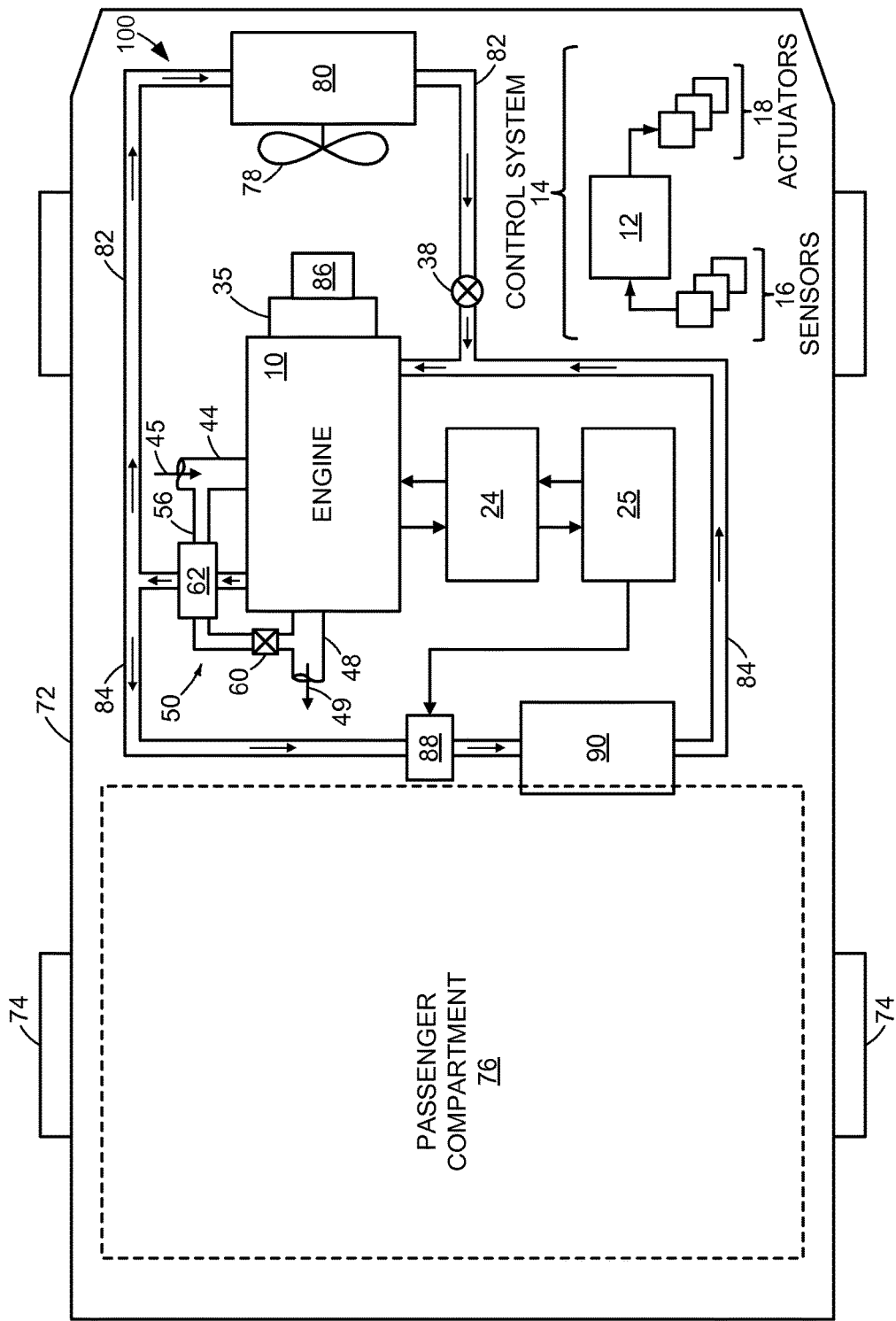
FIG. 1 shows a schematic diagram of an engine with a cooling system in a hybrid-electric vehicle.

The present description relates to a system and method for warming up a vehicle, particularly in cold ambient conditions. In FIG. 1, a schematic diagram of vehicle including an engine coupled to a coolant system is shown for reference. Then, in FIGS. 2-4, coolant circuit configurations that correspond to three different coolant operating modes are shown to illustrate how heat may flow based on the coolant flow and airflow within the engine system. The flow chart of FIG. 5 further illustrates how a controller may switch between the three modes based on temperatures measured in the engine.

Turning now to FIG. 1, an example embodiment of a cooling system 100 in a motor vehicle 72 is illustrated schematically. Cooling system 100 circulates coolant through internal combustion engine 10 and exhaust gas recirculation cooler (EGR) 62 to absorb waste heat and distributes the heated coolant to radiator 80 and/or heater core 90 via coolant lines 82 and 84, respectively.

In particular, FIG. 1 shows cooling system 100 coupled to engine 10 and circulating engine coolant from engine 10, through EGR cooler 62, and to radiator 80 via engine-driven water pump 86, and back to engine 10 via coolant line 82. Engine-driven water pump 86 may be coupled to the engine via front end accessory drive (FEAD) 35, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which in the example of FIG. 1, is directly proportional to engine speed. The temperature of the coolant may be regulated by a thermostat valve 38, located in the cooling line 82, which may be kept closed until the coolant reaches a threshold temperature.

Fan 78 may be further coupled to radiator 80 in order to maintain an airflow through radiator 80 when vehicle 72 is moving slowly or stopped while the engine is running. In some examples, fan speed may be controlled by controller 12. Alternatively, fan 78 may be coupled to engine-driven water pump 86.

As shown in FIG. 1, engine 10 may include an exhaust gas recirculation (EGR) system 50. EGR system 50 may route a desired portion of exhaust gas from exhaust passage 48 to intake passage 44 via EGR passage 56. The amount of EGR provided to intake passage 44 may be varied by controller 12 via EGR valve 60. Further, an EGR sensor (not shown) may be arranged within EGR passage 56 and may provide an indication of one or more of pressure, temperature, and concentration of the exhaust gas. Alternatively, the EGR may be controlled based on an exhaust oxygen sensor and/or and intake oxygen sensor. Under some conditions, EGR system 50 may be used to regulate the temperature of the air and fuel mixture within the combustion chamber. EGR system 50 may further include EGR cooler 62 for cooling exhaust gas 49 being reintroduced to engine 10. In such an embodiment, coolant leaving engine 10 may be circulated through EGR cooler 62 before moving through coolant line 82 to radiator 80.

After passing through EGR cooler 62, coolant may flow through coolant line 82, as described above, and/or through coolant line 84 to heater core 90 where the heat may be transferred to passenger compartment 76, and the coolant flows back to engine 10. In some examples, engine-driven pump 86 may operate to circulate the coolant through both coolant lines 82 and 84. In other examples, such as the example of FIG. 1 in which vehicle 72 has a hybrid-electric propulsion system, an electric auxiliary pump 88 may be included in the cooling system in addition to the engine-driven pump. As such, auxiliary pump 88 may be employed to circulate coolant through heater core 90 during occasions when engine 10 is off (e.g., electric only operation) and/or to assist engine-driven pump 86 when the engine is running. Like engine-driven pump 86, auxiliary pump 88 may be a centrifugal pump; however, the pressure (and resulting flow) produced by pump 88 may be proportional to an amount of power supplied to the pump by energy storage device 25.

In this example embodiment, the hybrid propulsion system includes an energy conversion device 24, which may include a motor, a generator, among others and combinations thereof. The energy conversion device 24 is further shown coupled to an energy storage device 25, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 74, engine 10 (e.g., provide a motor operation), auxiliary pump 88, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the torque source, with the hybrid propulsion system acting to selectively deliver added torque, for example during tip-in or other conditions. Further still, starter/generator and/or smart alternator systems may also be used. Additionally, the various components described above may be controlled by vehicle controller 12 (described below).

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 74. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or the transmission. Furthermore, energy conversion device 24 may act to augment or absorb torque during transitions of engine 10 between different combustion modes (e.g., during transitions between a spark ignition mode and a compression ignition mode).

FIG. 1 further shows a control system 14. Control system 14 may be communicatively coupled to various components of engine 10 to carry out the control routines and actions described herein. For example, as shown in FIG. 1, control system 14 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, gas pedal input, brake input, transmission selector position, vehicle speed, engine speed, mass airflow through the engine, ambient temperature, intake air temperature, etc.), cooling system sensors (such as coolant temperature, fan speed, passenger compartment temperature, ambient humidity, etc.), and others. Further, controller 12 may communicate with various actuators 18, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced. Such reduced output may be typical of idling conditions, which correspondingly also result in a relatively lower engine speed compared with driving operation, thus reducing coolant flow.

Figure 2:
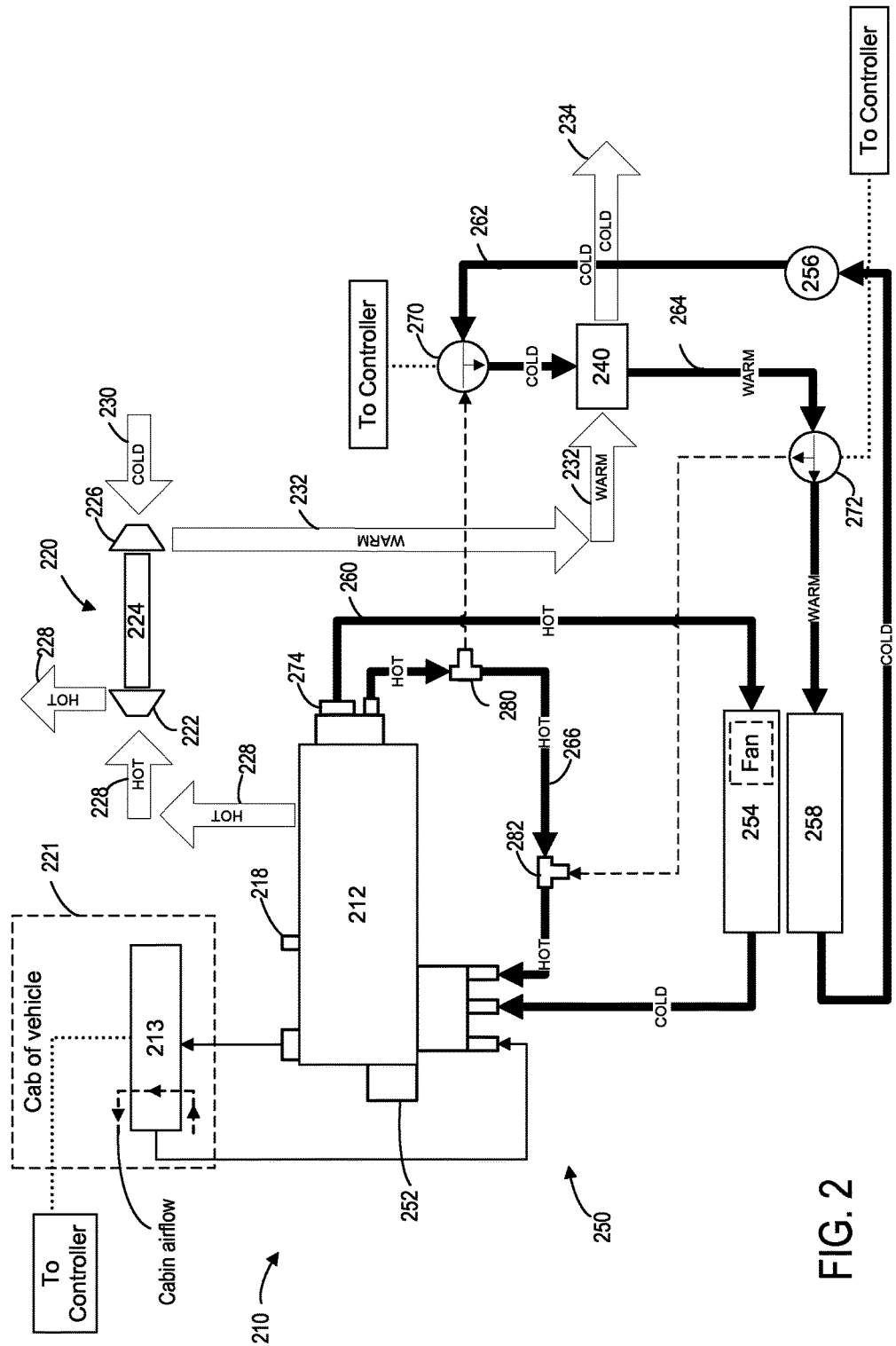
FIG. 2 is a schematic illustration of an engine system including a coolant system operating in a first mode.

Referring to FIG. 2, example engine system 210 that includes an internal combustion engine and heater unit 213 is shown in a first operating mode. The heater is provided to warm the vehicle since hot engine coolant is circulated from engine 212 through heater unit 213 and back to engine 212. Engine system 210 further includes a turbocharger 220 with turbine 222 which is rotatably driven by exhaust gas 228 from engine 212. Turbine 222 is connected to shaft 224 that is further connected to compressor 226 such that compressor 226 is driven by turbine 222 to compress intake air 230. The compression of intake air 230 raises the temperature and thus reduces the density of the compressed air shown at 232. To counteract this, a charge air cooler 240 thermally coupled a coolant system is provided for exchanging heat with the coolant in order to cool the compressed air 232 when the coolant system operates in the first mode. Although not shown explicitly, the cooled air 234 is then passed to engine 212.

Engine system 210 also includes coolant system 250. When coolant system 250 is operating in a first mode, also referred to as a default mode, valves within coolant system 250 are adjusted so two separate coolant circuits are present in the circuit.

The first coolant circuit cools engine 212. In this part of the circuit, coolant is pumped by a first pump 252 along a first conduit 260 to a first heat exchanger 254 where heat is transferred from the coolant. The cooled coolant is then returned to engine 212.

The second coolant circuit is separate from the first coolant circuit and cools air passing through charge air cooler 240. In this part of the circuit, coolant is pumped by a second pump 256 along a second conduit 262 and through charge air cooler 240 where heat is transferred from compressed air 232 to the coolant. As noted above, the temperature of compressed air 232 is warm prior to passing through charge air cooler 240 and cool after leaving the unit. After leaving the charge air cooler, the coolant continues to second heat exchanger 258 where heat is transferred from the coolant. The cooled coolant then returns to charge air cooler 240 where heat transfer continues in the manner already described.

Because the method includes adjusting coolant flows within the circuit, coolant system 250 includes a number of valves that can be actuated to adjust the path through which coolant flows in the circuit. As described in more detail below, some of these valves physically connect the first and second circuits but are configured in the first mode so as to keep the first and second circuits operating separately.

As described with respect to FIG. 1, the engine system may further include a controller for adjusting the configuration of valves in the circuit which thereby controls the mode in which the coolant system operates. As such, the valving of the engine system may be operable to provide the plurality of coolant circuits described. In one embodiment, the valving may comprise at least one valve that is a solenoid valve.

Figure 3:
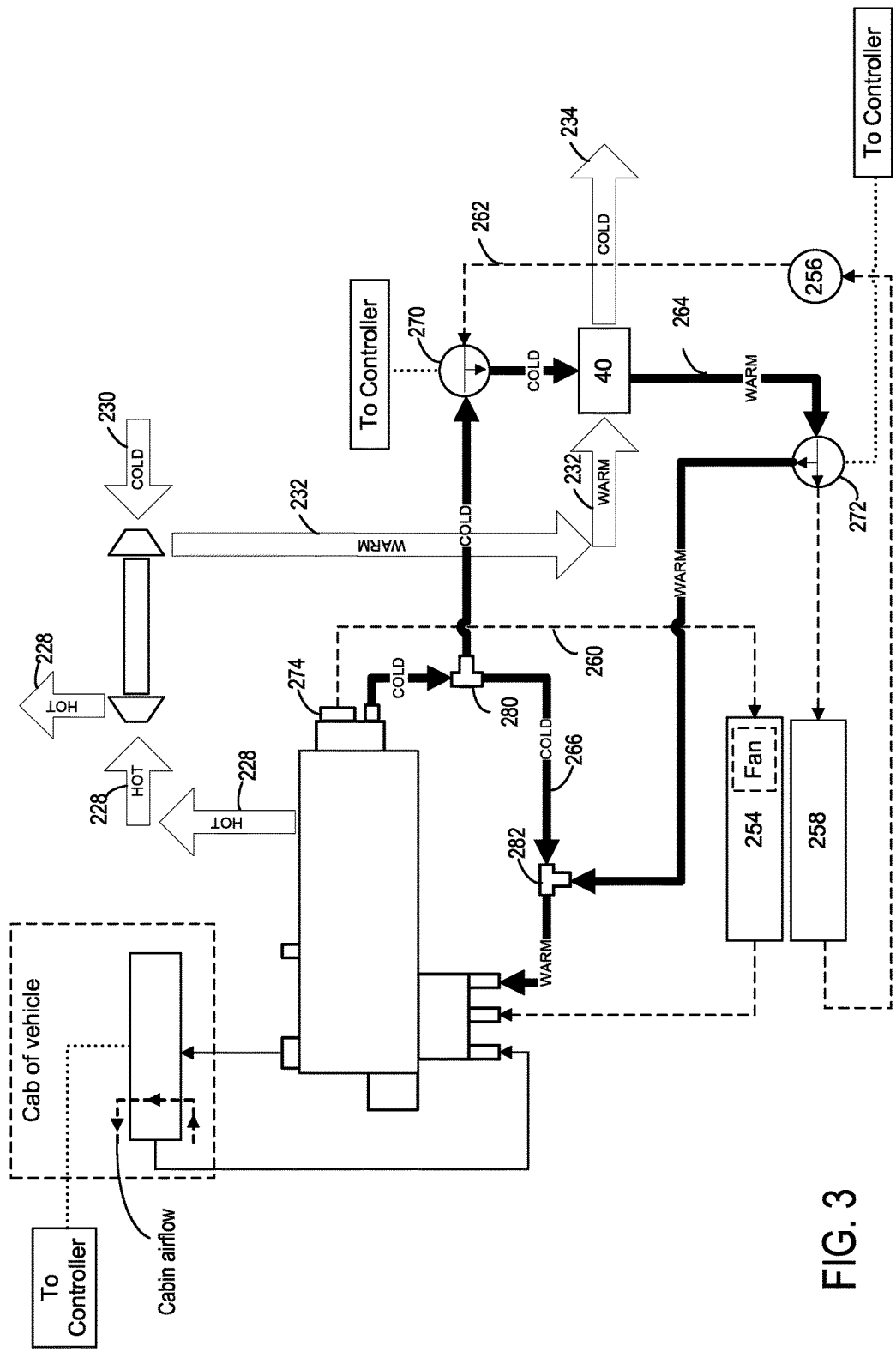
FIG. 3 is a schematic illustration of an engine system including a coolant system operating in a second mode.
Figure 4:
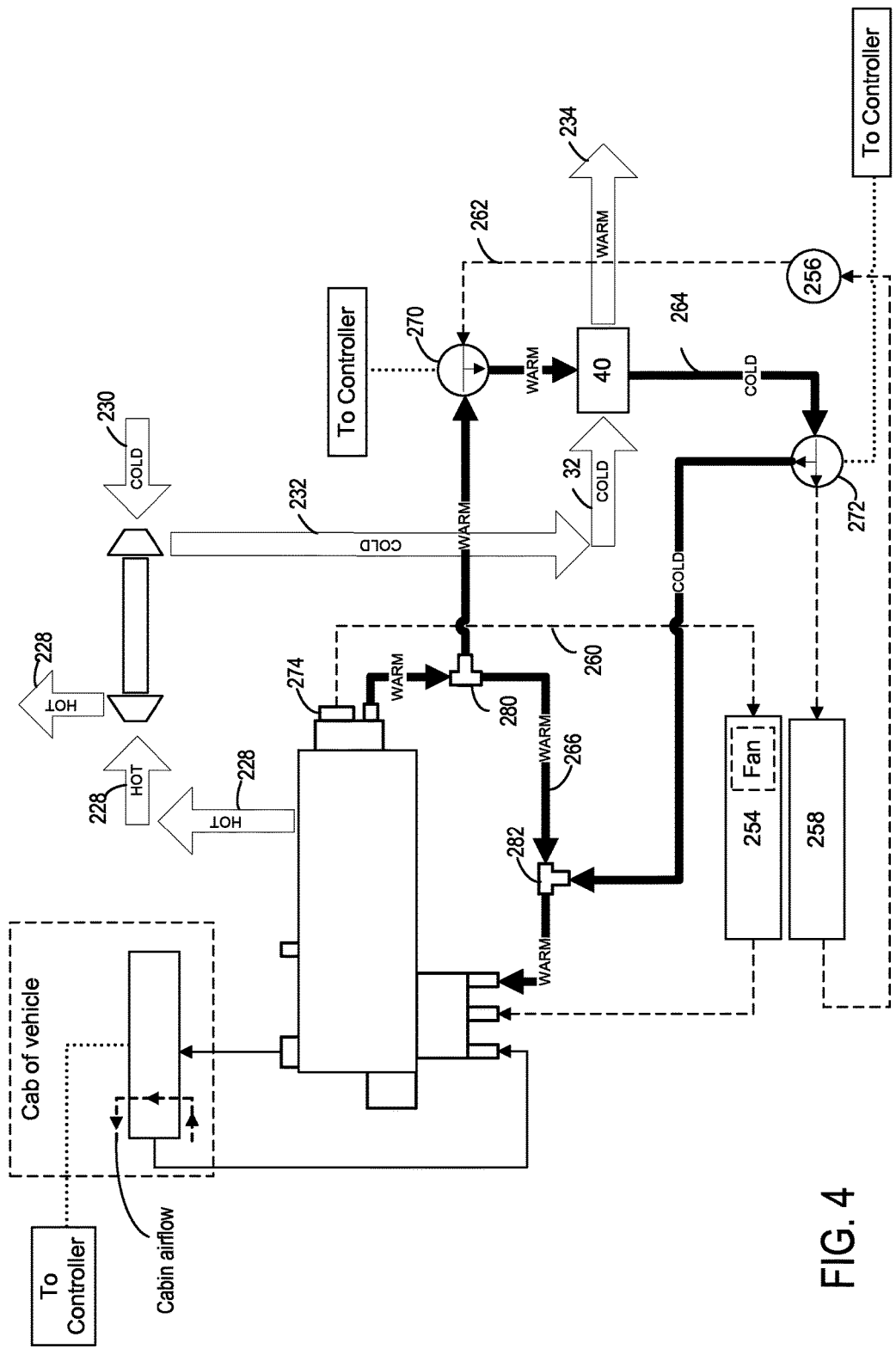
FIG. 4 is a schematic illustration of an engine system including a coolant system operating in a third mode.

A first valve 270 is provided within the coolant circuit upstream of the charge air cooler 240. As such, this valve may be adjusted to supply coolant to charge air cooler 240. In one embodiment, the first valve 270 is a three way solenoid valve having a first inlet connected to second conduit 262. While engine system 210 is operating in the first mode, the first valve 270 allows coolant to pass from a first inlet to the outlet of first valve 270. However, first valve 270 is also comprised of a second inlet which is connected to first T-piece 280 that is located within the first coolant circuit. In the first operating mode, the first valve 270 is adjusted to prevent the passage of coolant from the second inlet to the outlet of first valve 270. In FIGS. 2-4, a conduit for coolant flow allowing a flow of coolant is represented by a solid line while a conduit for coolant flow that prevents a flow of coolant is represented by a dashed line. Alternatively, block arrows depict a flow of air within the engine system.

A second valve 272 is provided in the coolant circuit downstream of charge air cooler 240. Therefore, second valve 272 receives coolant from the charge air cooler device via an inlet connected to third conduit 264. As described above, the second valve 272 may also be a three way solenoid valve but in this example second valve 272 is comprised of a single inlet coupled to first and second outlets. The first outlet is connected to the second heat exchanger 258 such that, in the first operating mode, the second valve 272 allows the passage of coolant to the second heat exchanger 258. The second outlet is connected to second T-piece 282 provided in the first coolant circuit. During the first operating mode, settings within second valve 272 are adjusted to prevent the passage of coolant from the second coolant circuit to the first coolant circuit.

A third valve 274 selectively allows the passage of coolant from engine 212 through the first heat exchanger 254. In the first operating mode, passage of coolant through the third valve is allowed.

With regard to the operation of engine system 210, when coolant system 250 is in the first mode, hot compressed air 232 is passed through the charge air cooler 240 where it is cooled by cold coolant from the second heat exchanger 258 before continuing to the engine for use during combustion. The coolant flowing in the circuit is warmed by the transfer of heat from compressed air 232 which is further exchanged at second heat exchanger 258. Coolant heated by engine 212 is simultaneously but separately circulated through the first heat exchanger 254. A fourth conduit 266 which includes the first and second T-pieces also circulates coolant but without any substantial heat transfer in the first operating mode.

Engine system 210 further includes a controller coupled to sensors and actuators therein that can determine when adjustments are to be made based on engine operating conditions. For example, in one embodiment, engine system 210 may include a first temperature sensor (not shown) configured to measure the ambient air temperature outside the vehicle and a second temperature sensor 218 that measures engine coolant temperature (ECT) from a temperature sensor coupled to a cooling sleeve of engine 212. These sensors are connected to control system 14 which may further control the configuration of the valves based on temperatures detected therein.

In one embodiment, control system 14 may be comprised of a microcomputer, including a microprocessor unit, input/output ports, an electronic storage medium for executable programs and calibration values shown as a read-only memory chip, random access memory, keep alive memory, and a data bus. Control system 14 may further include controller 12 that is in communication with and, therefore, receives various signals from sensors 32 coupled to engine system 210, in addition to those signals previously discussed. For example, engine system 210 may also include measurement of inducted mass air flow (MAF) from a mass air flow sensor; a profile ignition pickup signal (PIP) from a Hall effect sensor (or other type) coupled to a crankshaft within the engine; throttle position (TP) from a throttle position sensor; absolute manifold pressure signal, MAP; and exhaust constituent concentration from exhaust gas sensors. Engine speed signal, RPM, may be generated by controller 12 from signal PIP. The storage medium read-only memory can further be programmed with non-transitory, computer readable data representing instructions executable by the processor for performing the methods described below as well as other variants that are anticipated but not specifically listed. The controller is configured by software in the vehicle's Powertrain Control Module (PCM). The controller and software allow the coolant system to be readily configured for operation in a number of distinct modes in order to optimize the heat distribution in the engine. This allows the separate circuits to be linked based on detected conditions within the engine.

Turning to the second operating mode, FIG. 3 shows the arrangement of valves within coolant system 250 whose operation is adjusted in response to engine conditions to adjust the flow of coolant, which thereby allows for the heat distribution within the engine to be adjusted and controlled. For example, when the ambient temperature falls below a first predetermined temperature, for instance 15 degrees Centigrade, and the engine temperature measured by second temperature sensor 218 indicates the coolant within the engine is relatively cold, for instance just after ignition when the engine has not been running for long, controller 12 may adjust valves within the coolant circuit to switch the vehicle to the second operating mode. In the example system described, the controller may switch the valves to a different setting in order to adjust the circuit configuration and thereby adjust the flow of coolant therein. The second flow configuration, or second operating mode, is shown in FIG. 2.

In the second operating mode, the first valve 270 is switched to prevent the passage of coolant from the second conduit 262 via the first valve inlet. Instead, during this mode, the coolant flows from the engine into first valve 270 via the second inlet. In addition, the second valve 272 is also switched to prevent the passage of coolant to second heat exchanger 258 so fluid instead flows to engine 212 via the second T-piece 282. In the second operating mode, the third valve 274 closes to prevent the passage of coolant through first heat exchanger 254. Therefore, controller 12 may adjust all three valves to switch from the first to the second operating mode.

When coolant system 250 is in the second mode, hot compressed air 232 is also passed through the charge air cooler 240 in the same manner as described above with respect to the first operating mode. However, cold engine coolant (as determined by the second temperature sensor) is also passed to the charge air cooler 240 so the compressed air 232 is cooled by cold coolant before continuing back to engine 212. Therefore, the coolant is warmed by the transfer of heat from the compressed air 232 in a similar manner as described with respect to FIG. 2. After heat is exchanged between the hot compressed air and the cold coolant, the heated coolant is returned to engine 212 through the adjusted second valve 272 and the example pathway shown where the heat serves to further warm engine 212. By closing the third valve 274, heat loss from engine 212 due to the passage of coolant through the first heat exchanger 254 is also substantially eliminated.

Coolant system 250 is further operable in a third operating mode to be used when ambient conditions are cold but engine 212 is relatively hot (for instance, after the engine has been running for some time). As such, when engine 212 is hot, cold intake air may result in decreased combustion performance/stability. For this reason, the valve configurations of the third operating mode are identical to those of the second mode described above with respect to FIG. 3. However, controller 12 may opt to run coolant system 250 in the third operating mode based on a different set of environmental/engine conditions in order to achieve different engine operating characteristics.

For example, during the third operational mode, intake air 230 is compressed by compressor 226 of turbocharger 220 as described already. However, based on the engine conditions during this mode, the compressed air 232 is still not as hot as desirable to warm-up the engine. As such, compressed air 232 is passed through the charge air cooler 240 concurrently with hot engine coolant so compressed air 232 is further heated by the coolant before continuing to engine 212. Based on the configuration of second valve 272, coolant is also returned to engine 212 in the same manner described with respect to the second mode. The third valve 274 is closed to prevent the passage of coolant through the first heat exchanger 254.

Figure 5:
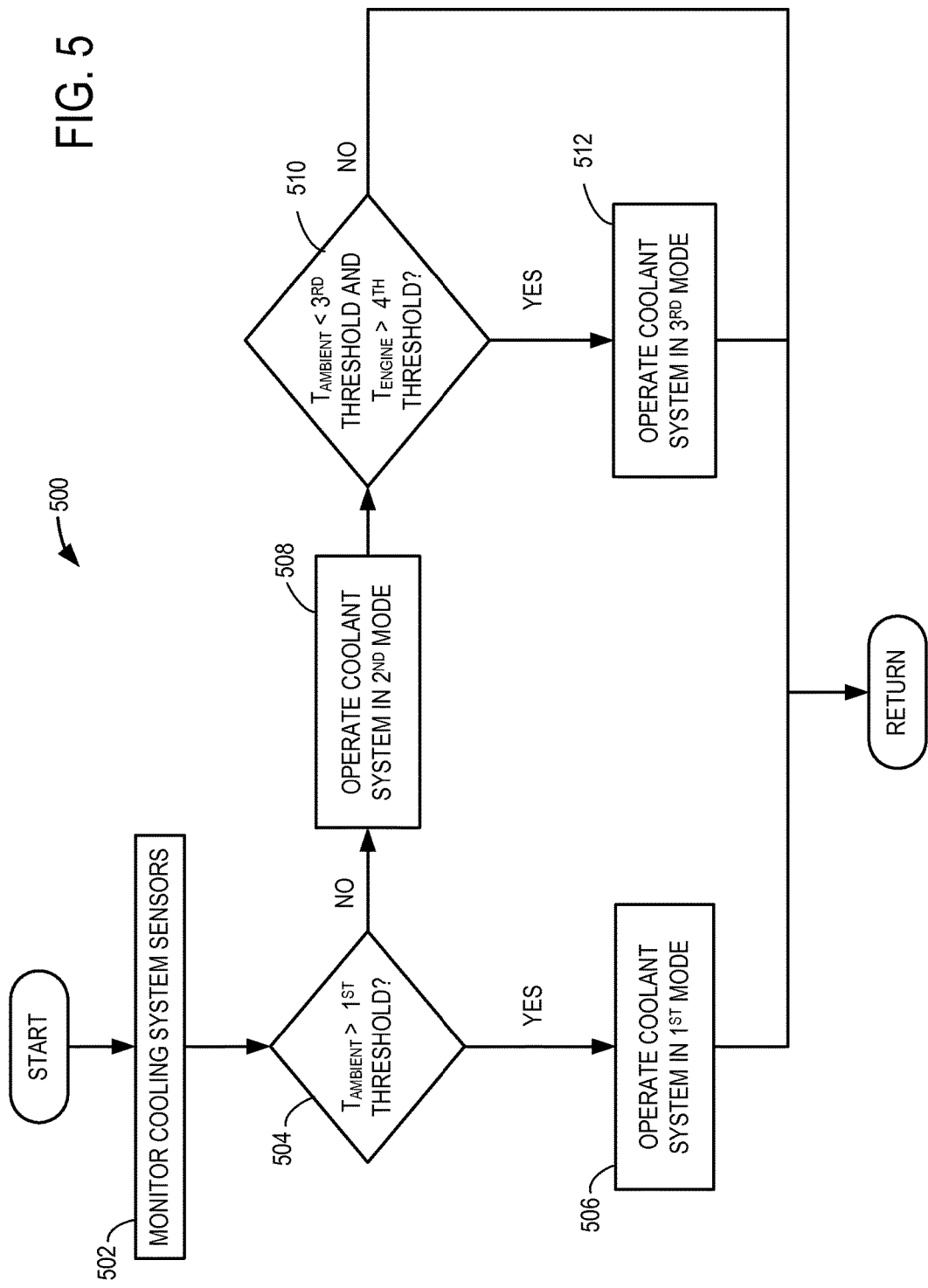
FIG. 5 is a flow chart illustrating a method for switching between modes based on a measured temperature.

Turning to control of the coolant system, FIG. 5 shows a flow chart of method 500 that depicts one method a controller may use to adjust valves within coolant system 250 when determining whether to switch the coolant system between the three operating modes. As one example, method 500 is operable to switch between modes dependent on one or more of an ambient temperature ($T_{AMBIENT}$) and engine temperature ($T_{ENGINE}$). In other examples, method 500 may further consider engine operating points like engine speed or load.

At 502, method 500 includes monitoring sensors within the coolant system to determine whether coolant system operation is adequate for the conditions detected or whether valves are to be adjusted to switch to another operating mode, for instance, in order to warm-up the engine. For example, engine system 210 may include a first temperature sensor for measuring $T_{AMBIENT}$. In one embodiment, the coolant system may be adapted to operate in the first operating mode by directing engine coolant flow through first heat exchanger 254 when the ambient temperature is above a first predetermined temperature (e.g. 15 degrees Centigrade). Therefore, at 504, method 500 includes comparing $T_{AMBIENT}$ to a first temperature threshold and at 506 a controller may adjust valves in coolant system 250 to the first configuration in order to operate the engine in the first operating mode described above in FIG. 2. In another embodiment, if $T_{AMBIENT}$ falls below the first temperature threshold, at 508 the coolant system may be switched to the second operating mode described in FIG. 3.

Engine system 210 may include a second temperature sensor for measuring a temperature at the engine. In some embodiments, if $T_{ENGINE}$ is above the second temperature threshold, the coolant system may be switched to operate in a third mode that provides a fourth coolant circuit wherein the valving is configured identically to the valving in the second mode but where air passing through the charge air cooler device is heated instead of cooled. However, as shown at 510 of method 500, the coolant system may also be adapted to switch to the third mode when $T_{AMBIENT}$ falls below a third temperature threshold and $T_{ENGINE}$ is above a fourth temperature threshold. In some instances, the third temperature threshold may be equal to the first temperature threshold while the fourth temperature threshold may be equal to the second temperature threshold. Based on a cool ambient temperature (e.g. below a third temperature threshold) and a warm engine temperature (e.g. above a fourth temperature threshold), at 512, the coolant system may be adjusted to operate in the third mode. If controller 12 determines that a switch to the third operating mode is not to occur, it may instead continue to monitor sensors within the engine system to further determine which operating mode the coolant system is to operate.

The system and methods described herein may enhance engine warm-up without costly additional devices. Furthermore, advantages are offered in that engine warm-up is achieved without adversely affecting vehicle fuel economy, especially in cold ambient temperatures. Therefore, enhanced fuel economy may be obtained through enhanced combustion stability in severely cold ambient temperatures. In addition, the system described is straightforward to implement in an engine system.

This concludes the description. Although specific embodiments have been described, the reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine comprising:
   a turbocharger to compress intake air;
   a charge air cooler operatively interposing the turbocharger and the engine; and
   a coolant system whose operation comprises:
   a first mode providing a first coolant circuit for cooling the engine and a second separate coolant circuit including the charge air cooler for cooling compressed air,
   a second mode providing a third coolant circuit in which coolant from the engine is transmitted to the charge air cooler for heating the coolant, and
   a plurality of valves, said valves being configured to prevent the passage of coolant from the second coolant circuit to the first coolant circuit in the first mode, said valves being further configured to provide the third coolant circuit in the second mode;
   wherein, in the first mode, the coolant is prevented from passing from the second coolant circuit to the first coolant circuit.

2. The engine of claim 1, wherein the coolant system is operable to switch between modes dependent on one or more of an ambient temperature, an engine temperature and an engine operating point,
   wherein the plurality of valves comprises first, second, and third valves,
   wherein the engine further comprises first and second heat exchangers, and
   wherein the first coolant circuit comprises the engine, the first heat exchanger, and the third valve.

3. The engine of claim 2, further including a first temperature sensor for measuring an ambient temperature, wherein the coolant system is adapted to operate in the first mode when the ambient temperature is above a first temperature threshold, and
   wherein the second coolant circuit comprises the first and second valves, the charge air cooler, and the second heat exchanger.

4. The engine of claim 3, wherein the coolant system is adapted to switch to the second mode when the ambient temperature falls below the first temperature threshold, and
   wherein the third coolant circuit comprises the first and second valves, the charge air cooler, and the engine.

5. The engine of claim 4, further including a second temperature sensor for measuring an engine temperature at the engine, wherein the coolant system is switchable to operate in a third mode when the engine temperature is above a second temperature threshold, and
   where coolant in the first coolant circuit passes sequentially through the engine, the third valve, and the first heat exchanger.

6. The engine of claim 5, wherein the coolant system is operable in the third mode to provide the third coolant circuit for heating air passing through the charge air cooler, and
   where coolant in the second coolant circuit passes sequentially through the first valve, the charge air cooler, the second valve, and the second heat exchanger.

7. The engine of claim 6, wherein the coolant system is adapted to switch to the third mode when the ambient temperature is below a third temperature threshold and the engine temperature is above a fourth temperature threshold, and
   where coolant in the third coolant circuit passes sequentially through the engine, the first valve, the charge air cooler, and the second valve.

8. The engine of claim 7, wherein a controller adjusts the plurality of valves in the coolant system to adjust a circuit configuration and switch between operating modes.

9. The engine of claim 8, wherein the coolant system includes a heat exchanger for transferring heat from the coolant, the heat exchanger further comprising the first heat exchanger provided in the first coolant circuit and the second heat exchanger provided in the second coolant circuit.

10. The engine of claim 9, wherein the first valve is operable to:
    allow a passage of coolant circulating in the second coolant circuit when the coolant system is in the first mode,
    prevent the passage of coolant circulating in the second coolant circuit when the coolant system is in a different mode, and wherein
    the first valve further allows the passage of coolant from the engine to the charge air cooler when the coolant system is in the second mode.

11. The engine of claim 10, wherein the second valve is operable to prevent the passage of coolant circulating in the second coolant circuit and the second heat exchanger when the coolant system is in the second mode,
    the second valve allows the passage of coolant from the charge air cooler to the engine when the coolant system is in the second mode, and
    the second valve allows the passage of coolant from the charge air cooler to the second heat exchanger when the coolant system is in the first mode.

12. The engine of claim 11, wherein the third valve selectively allows the passage of coolant from the engine to the first heat exchanger, and wherein the third valve prevents the passage of coolant through the first heat exchanger when the coolant system is in the second mode.

13. The engine of claim 12, wherein the plurality of valves in the third mode is configured identically to the plurality of valves in the second mode, the plurality of valves being configured to prevent the passage of coolant to the first and second heat exchangers in each of the second and third modes.

14. A method for operating a coolant system comprising:
    compressing intake air with a turbocharger;
    directing compressed air to a charge air cooler device coupled to the coolant system for exchanging heat with coolant; and adjusting a plurality of valves in order to adjust a flow of coolant based on a temperature, where coolant system operation further includes:
- a first mode that provides a first coolant circuit for cooling an engine and a second separate coolant circuit for cooling air passing through the charge air cooler device, the plurality of valves being in a first state, where coolant is prevented from passing from the second coolant circuit to the first coolant circuit in the first mode;
- a second coolant mode that provides a third coolant circuit in which coolant from the engine is transmitted to the charge air cooler device for heating before being recirculated back to the engine, the plurality of valves being in a second state; and
- a third coolant mode that provides the third coolant circuit for heating air passing through the charge air cooler device, the plurality of valves being in the second state.

15. The method of claim 14, wherein the coolant system switches between operating modes by adjusting the plurality of valves to further adjust a circuit configuration,
- wherein the plurality of valves includes a first valve located downstream of the engine and a second heat exchanger, the first valve further being located upstream of the charge air cooler device, and
- wherein the first valve allows the passage of coolant from the second heat exchanger to the charge air cooler device in the first state, and the first valve allows the passage of coolant from the engine to the charge air cooler device in the second state.

16. The method of claim 15, wherein switching between operating modes depends on one or more of an ambient temperature, an engine temperature, and an engine operating point, where:
- a first temperature sensor is included for measuring an ambient temperature, and a second temperature sensor is included for measuring an engine temperature at the engine,
- wherein the plurality of valves includes a second valve located downstream of the charge air cooler device, the second valve further being located upstream of the engine and the second heat exchanger, and
- wherein the second valve allows the passage of coolant from the charge air cooler device to the second heat exchanger in the first state, and the second valve allows the passage of coolant from the charge air cooler device to the engine in the second state.

17. The method of claim 16, wherein the coolant system operates in the first mode when the ambient temperature is above a first temperature threshold and switches to the second mode when the ambient temperature falls below the first temperature threshold,
- wherein the plurality of valves includes a third valve located downstream of the engine, the third valve further being located upstream of a first heat exchanger, and
- wherein the third valve allows the passage of coolant between the engine and the charge air cooler device in the first state, and the third valve prevents the passage of coolant from the engine to the first heat exchanger in the second state.

18. The method of claim 17, wherein the coolant system switches to the third mode when the ambient temperature is below a third temperature threshold and the engine temperature is above a fourth temperature threshold,
- wherein the first state prevents the passage of coolant from the second coolant circuit to the first coolant circuit, and
- wherein the second state prevents the passage of coolant through the first and second heat exchangers.

19. A method for managing heat flow in an engine comprising:
- a charge air cooler device thermally coupled to a compressed intake airflow, wherein
  - heat is exchanged between the airflow and coolant based on a temperature measured therein,
- a flow of coolant is adjusted based on the measured temperature, which includes at least one of an ambient temperature and an engine temperature, and wherein
- operation of a coolant system includes:
  - a first mode that provides a first coolant circuit for cooling the engine and a second separate coolant circuit for cooling air passing through the charge air cooler device, wherein coolant is prevented from passing from the second coolant circuit to the first coolant circuit in the first mode,
  - a second mode that provides a third coolant circuit in which coolant from the engine is transmitted to the charge air cooler device for heating before being recirculated back to the engine, and
  - a third mode that provides the third coolant circuit for heating air passing through the charge air cooler device.

20. The method of claim 19, wherein the heat flow in the engine is adjusted by switching between the three modes, wherein the switching includes adjusting a plurality of valves within the coolant system to adjust a circuit configuration,
- wherein the first mode is selected responsive to the ambient temperature being greater than a first threshold, the second mode is selected responsive to the ambient temperature being below the first threshold and above a third threshold, and the third mode is selected responsive to the ambient temperature being below the third threshold and the engine temperature being above a fourth threshold,
- wherein the plurality of valves includes a first valve, and
- wherein the first valve allows the passage of coolant from the charge air cooler device to a heat exchanger in the first mode, and the first valve allows the passage of coolant from the charge air cooler device to the engine in the second and third modes.

* * * * *